(12) United States Patent
Kim

(10) Patent No.: US 7,585,589 B2
(45) Date of Patent: *Sep. 8, 2009

(54) POUCH-TYPE LITHIUM SECONDARY BATTERY

(75) Inventor: Joong-Hun Kim, Cheonan (KR)

(73) Assignee: Samsung SDI Co., Ltd., Suwon-si (KR)

( * ) Notice: Subject to any disclaimer, the term of this patent is extended or adjusted under 35 U.S.C. 154(b) by 780 days.

This patent is subject to a terminal disclaimer.

(21) Appl. No.: 11/186,835

(22) Filed: Jul. 22, 2005

(65) Prior Publication Data

US 2006/0019156 A1 Jan. 26, 2006

Related U.S. Application Data

(63) Continuation-in-part of application No. 10/733,335, filed on Dec. 12, 2003, now Pat. No. 7,201,998.

(30) Foreign Application Priority Data

Dec. 17, 2002 (KR) ............... 2002-80873

(51) Int. Cl.
*H01M 2/06* (2006.01)
*H01M 2/08* (2006.01)

(52) U.S. Cl. ..................... 429/184; 429/162

(58) Field of Classification Search .............. 429/94, 429/162, 180, 181, 184

See application file for complete search history.

(56) References Cited

U.S. PATENT DOCUMENTS

| | | | | |
|---|---|---|---|---|
| 4,664,994 A | * | 5/1987 | Koike et al. | 429/181 X |
| 5,183,715 A | * | 2/1993 | North | 429/312 |
| 5,449,575 A | * | 9/1995 | Moulton | 429/162 X |
| 6,267,790 B1 | * | 7/2001 | Daroux et al. | 429/180 X |
| 6,277,516 B1 | * | 8/2001 | Sasaki et al. | 429/162 |

(Continued)

FOREIGN PATENT DOCUMENTS

CN 1262790 A 8/2000

(Continued)

OTHER PUBLICATIONS

Office Action issued by Japanese Patent Office on Apr. 22, 2008 in Japanese Application No. 2003-290945.

(Continued)

*Primary Examiner*—Stephen J. Kalafut
(74) *Attorney, Agent, or Firm*—Stein McEwen LLP (57) ABSTRACT

A pouch-type lithium secondary battery includes a battery unit having a positive plate, a separator, and a negative plate; a plurality of electrode tabs drawn from the positive and negative plates, respectively; a case having a space for receiving the battery unit and upper and lower sealing surfaces which are thermally fused to each other; a short-circuit prevention tape attached along the upper and lower sealing surfaces; and a polymer material coated on at least a portion of each electrode tab corresponding to the upper and lower sealing surfaces. A portion of the insulating tape exposed outside the sealing surface of the case is extended and the extended portion of the insulating tape comes in contact with the end portion of the sealing surface after being folded. Therefore, preventing an electrical short circuit between the electrode tab and the intermediate layer of the metal case is achieved.

22 Claims, 7 Drawing Sheets

U.S. PATENT DOCUMENTS

| | | | |
|---|---|---|---|
| 6,444,351 B1 * | 9/2002 | Goto | 429/181 X |
| 6,632,538 B1 | 10/2003 | Yamazaki et al. | 428/461 |
| 6,841,298 B2 * | 1/2005 | Yamashita et al. | 429/181 X |
| 7,201,998 B2 * | 4/2007 | Kim | 429/180 |

FOREIGN PATENT DOCUMENTS

| | | |
|---|---|---|
| JP | 62-61268 | 3/1987 |
| JP | 10-289696 | 10/1998 |
| JP | 11-312514 | 11/1999 |
| JP | 2000-156242 | 6/2000 |
| JP | 2000-268786 | 9/2000 |
| JP | 2001-25960 | 9/2001 |
| JP | 2002-203534 | 7/2002 |

OTHER PUBLICATIONS

Office Action issued in Chinese Patent Application No. 200310123923.8 on Oct. 13, 2006.

U.S. Appl. No. 10/733,335, filed Dec. 12, 2003, Joong-Hun Kim, Samsung SDI Co., Ltd.

* cited by examiner

POUCH-TYPE LITHIUM SECONDARY BATTERY

CROSS-REFERENCE TO RELATED APPLICATIONS

This application is a continuation-in-part of U.S. application Ser. No. 10/733,335 filed Dec. 12, 2003, now U.S. Pat. No. 7,201,998, and claims the priority of Korean Patent Application No. 2002-80873, filed on Dec. 17, 2002, in the Korean Intellectual Property Office, the disclosure of which is incorporated herein by reference.

BACKGROUND OF THE INVENTION

1. Field of the Invention

The present invention relates to a lithium secondary battery, and more particularly, to a pouch-type lithium secondary battery with improved arrangement of an electrode tab with respect to the sealing surface of a case thereof.

2. Description of the Related Art

Recently, with development of portable electronic devices such as cellular phones, notebook computers, and camcorders, chargeable/dischargeable secondary batteries have been actively studied. Examples of such secondary batteries include nickel-cadmium batteries, nickel-metal hydride batteries, nickel-hydrogen batteries, and lithium secondary batteries. Among these batteries, lithium secondary batteries have an operation voltage of 3.6 V, which is three times higher than the operation voltage of nickel-cadmium batteries or nickel-metal hydride batteries, which have been the main sources of power for portable electronic devices. In addition, lithium secondary batteries have an excellent energy density per unit weight. Therefore, use of lithium secondary batteries has been rapidly increasing.

According to the kind of an electrolyte used, lithium secondary batteries are classified as lithium ion batteries, which use a liquid electrolyte, and lithium polymer batteries, which use a polymer electrolyte.

Lithium secondary batteries may be manufactured in various shapes. Representative shapes of lithium secondary batteries are a cylinder and a prism, which are common shapes of lithium ion batteries. Recently, a flexible pouch-type lithium polymer battery has been attracting attention because of its relatively easily changeable shape, excellent safety, and lightweight. Such a pouch-type lithium polymer battery enables further reduction in the size and weight of portable electronic devices.

Figure 1:
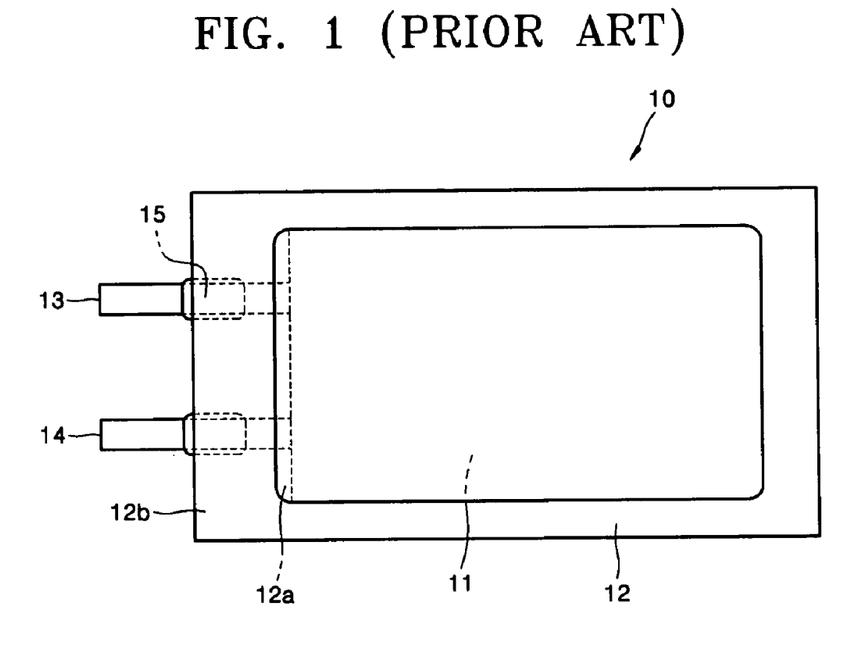
FIG. 1 illustrates a top plan view of a conventional lithium secondary battery.

FIG. 1 illustrates a top plan view of a conventional lithium secondary battery. Referring to FIG. 1, the lithium secondary battery 10 comprises a battery unit 11 and a case 12, which is formed with a space 12a for receiving the battery unit 11.

The battery unit 11 comprises a positive plate, a negative plate, and a separator interposed therebetween. The battery unit 11 is formed by winding the positive plate, the separator, and the negative plate, which are sequentially wound into a jelly-roll structure, or sequentially laminating the positive plate, the separator, and the negative plate into a stack structure.

A positive tab 13 and a negative tab 14 electrically connected to the respective electrode plates of the battery unit 11 are installed such that a predetermined length of them is exposed outside upper and lower sealing surfaces 12b of the case 12. Portions of the electrode tabs 13 and 14 that come in contact with the upper and lower sealing surfaces 12b are wrapped with an insulating tape 15.

Figure 3:
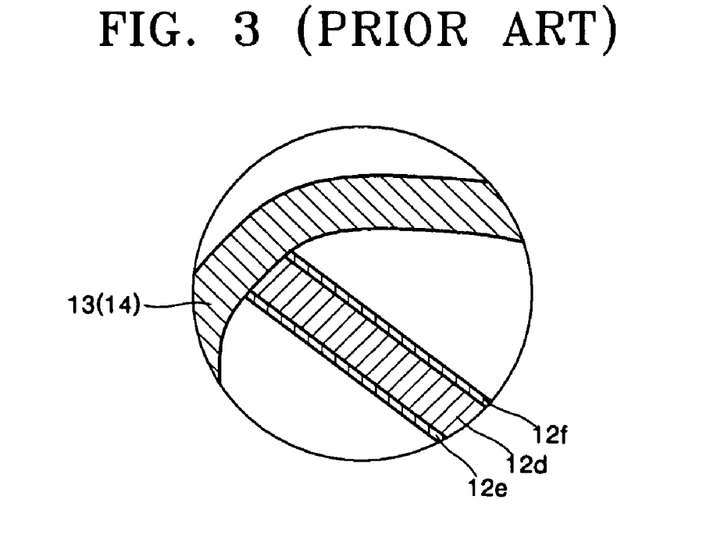
FIG. 3 illustrates an enlarged sectional view of an electrode tab and a sealing surface of FIG. 2 in contact.

As illustrated in FIG. 3, unlike a cylindrical or prismatic may made of a metal material, the case 12 has a pouch-type structure, which comprises an intermediate layer 12d made of a metal foil, and inner and outer layers 12e and 12f made of an insulating film. The case 12 is formed with the space 12a for receiving the battery unit 11 and with the upper and lower sealing surfaces 12b, which are thermally fused to each other.

Figure 2:
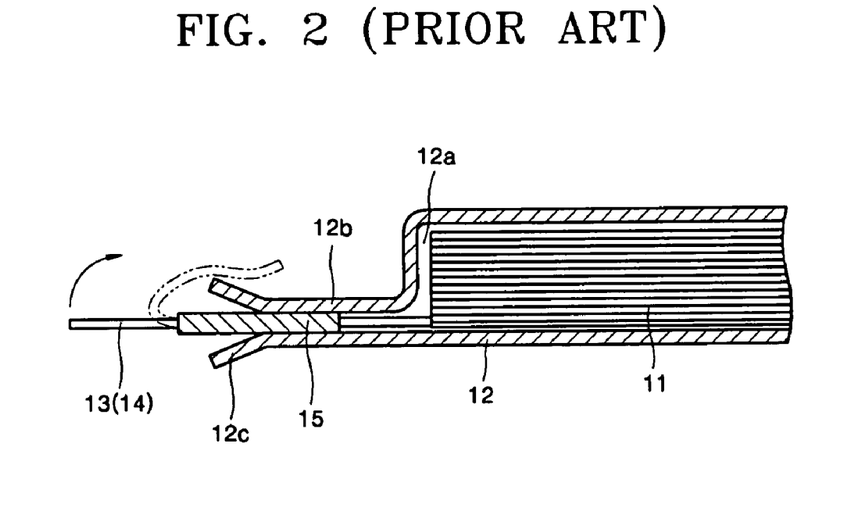
FIG. 2 illustrates a sectional view of the conventional lithium secondary battery of FIG. 1.

FIG. 2 illustrates a sectional view of the pouch-type lithium secondary battery of FIG. 1. Referring to FIG. 2, portions of the electrode tabs 13 and 14 are positioned between the upper and lower sealing surfaces 12b of the case 12 and end portions of the electrode tabs 13 and 14 are exposed outside the upper and lower sealing surfaces 12b of the case 12. Portions of the electrode tabs 13 and 14, which come in contact with the upper and lower sealing surfaces 12b, are wrapped with an insulating tape 15. In order to prevent the inner layer 12e from being pushed outward when the upper and lower sealing surfaces 12b are thermally fused to each other, end portions 12c of the upper and lower sealing surfaces 12b are upwardly and downwardly inclined at a predetermined angle with respect to the electrode tabs 13 and 14.

In order to manufacture the lithium secondary battery 10 with the aforementioned structure, first, the battery unit 11 is formed by winding or laminating a positive plate and a negative plate with a separator interposed therebetween. The formed battery unit 11 is inserted into the space 12a of the case 12. Then, the upper and lower sealing surfaces 12b of the case 12 are thermally fused to each other to hermetically seal the battery unit 11. In this case, the insulating tape 15, which wraps around the electrode tabs 13 and 14 and is interposed between the upper and lower sealing surfaces 12b, is also thermally fused to the upper and lower sealing surfaces 12b.

Next, end portions of the electrode tabs 13 and 14, which are exposed outside the case 12, are folded toward the case 12 at least one time. The end portions of the folded electrode tabs 13 and 14 are positioned outside one of the upper and lower sealing surfaces and are electrically connected to the terminal of a separately prepared protective circuit board (not shown).

However, such a conventional lithium secondary battery 10 has the following problems. When the electrode tabs 13 and 14 are folded toward the case 12 to electrically connect the end portions of the electrode tabs 13 and 14 to the protective circuit board, the inner surfaces of the electrode tabs 13 and 14 come in contact with the end portion 12c of the upper or lower sealing surface 12b. In this case, the intermediate layer 12d of the end portion 12c, which is exposed outside by a cutting process for completing the shape of the case 12, comes in contact with the electrode tabs 13 and 14. As a result, a short circuit between the case and the electrode tabs may occur. In addition, the protective circuit board, which is positioned outside one of the upper and lower sealing surfaces 12b, is likely to come in direct contact with outer surfaces of the upper and lower sealing surfaces 12b. For these reasons, the safety and reliability of the lithium secondary battery 10 may not be assured.

SUMMARY OF THE INVENTION

The present invention provides a pouch-type lithium secondary battery with enhanced stability, by improving the arrangement of electrode tabs and insulating tapes, which wrap the electrode tabs, with respect to a case thereof.

According to an aspect of the present invention, there is provided a pouch-type lithium secondary battery including: a battery unit having a positive plate, a separator, and a negative plate; a plurality of electrode tabs drawn from the positive and negative plates, respectively; a case having a space for receiving the battery unit and upper and lower sealing surfaces which are thermally fused to each other; a short-circuit prevention tape attached along the upper and lower sealing surfaces; and a polymer material coated on at least a portion of each electrode tab corresponding to the upper and lower sealing surfaces.

The pouch-type lithium secondary battery may further include an insulating tape for wrapping the electrode tabs, wherein a portion of the insulating tape interposed between the upper and lower sealing surfaces is thermally fused to the upper and lower sealing surfaces, and an end portion of the insulating tape is exposed outside the case together with the electrode tabs.

The short-circuit prevention tape may be attached in the widthwise direction of the upper and lower sealing surfaces. Each exposed portion of the electrode tabs may be disposed on the short-circuit prevention tape. The electrode tabs wrapped with the insulating tape may be folded, starting from an end portion of the upper or lower sealing surface, toward the case. The folded portion of the insulating tape may be at least 5% of the total width of the upper or lower sealing surface. The folded portion of the insulating tape may range from 5 to 90% of the total width of the upper or lower sealing surface.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the FIGURES.

Figure 4:
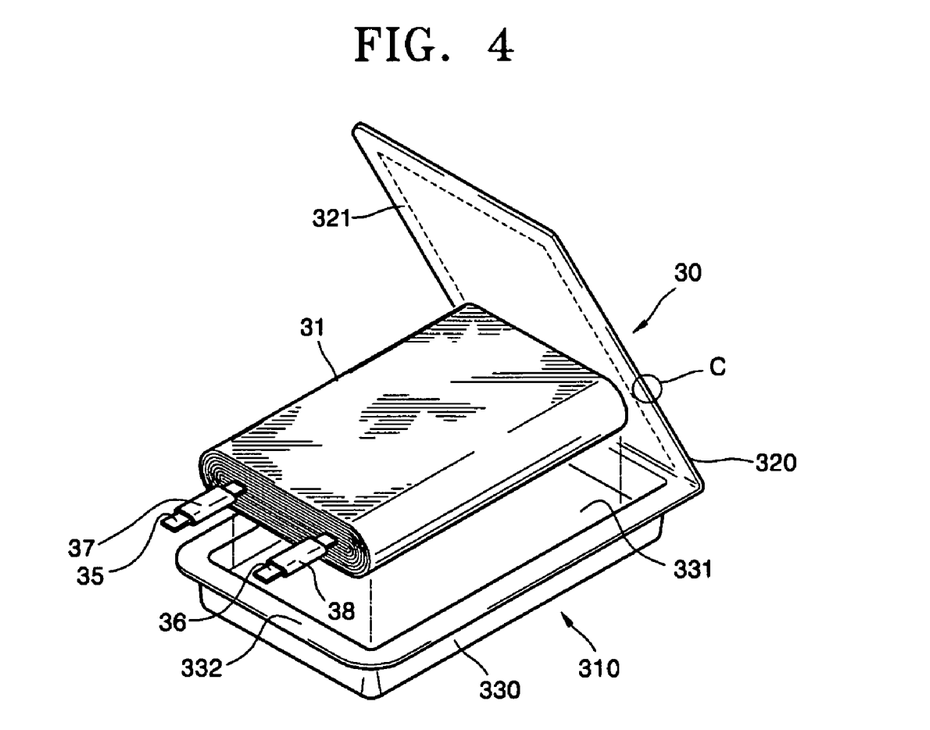
FIG. 4 illustrates an exploded perspective view of a lithium secondary battery according to an embodiment of the present invention.
Figure 5:
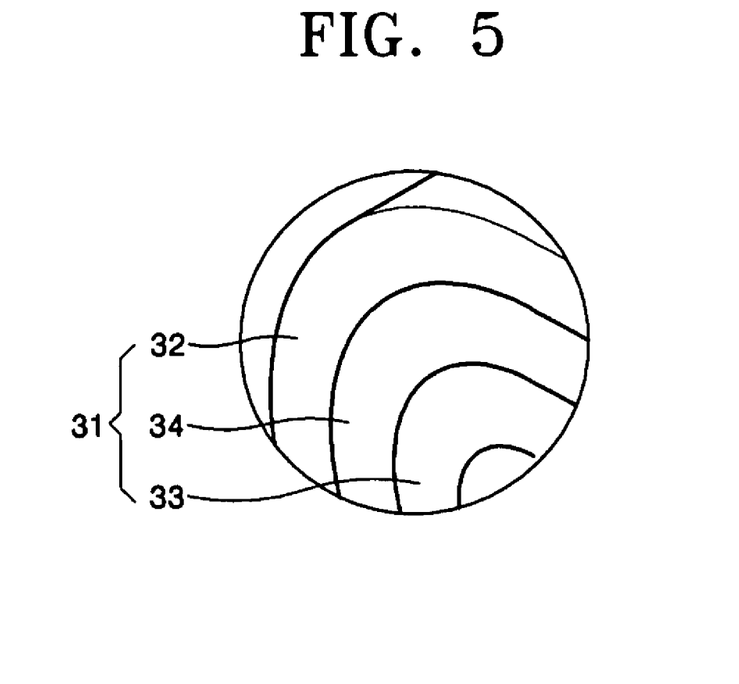
FIG. 5 illustrates an enlarged perspective view of a battery unit of FIG. 4.

FIG. 4 illustrates an exploded perspective view of a lithium secondary battery according to an embodiment of the present invention. FIG. 5 illustrates an enlarged perspective view of a battery unit of FIG. 4.

The battery unit 31 comprises a positive plate 32, a negative plate 33, and a separator 34, which is interposed therebetween, as illustrated in FIG. 5. The positive plate 32 is formed by coating a strip shaped metal plate such as a positive collector made of an aluminium film with an positive active material which comprises a lithium based oxide as a main component, a binder, and a conductive material. The positive plate 32 is electrically connected to a positive tab 35, which is wrapped with a positive insulating tape 37.

The negative plate 33 is formed by coating a strip shaped metal plate such as a negative collector made of a copper film with a negative active material which comprises a carbon material as a main component, a binder, and a conductive material. The negative plate 33 is electrically connected to the negative tab 36, which is wrapped with a negative insulating tape 38.

With respect to the separator 34, at least one separator is positioned between the positive plate 32 and the negative plate 33 to maintain electrical insulation therebetween. The separator 34 is made of a polyethylene film, a polypropylene film, or a combination thereof. According to an embodiment of the invention, the separator 34 is formed to be wider than the positive and negative plates 32 and 33 to prevent a short circuit between the positive and negative plates 32 and 33.

Referring to FIG. 4, the lithium secondary electrode 30 comprises a battery unit 31 and a case 310 for receiving the battery unit 31.

The case 310 comprises an upper portion 320 and a lower portion 330 which are coupled with each other. At least one side of the upper portion 320 is connected to at least one side of the lower portion 330. Such a case 310 has a cuboid form.

The lower portion 330 is formed with a space 331 for receiving the battery unit 31 and with a lower sealing surface 332 along the edge of the space 331. The upper portion 320 is also formed with an upper sealing surface 321, which corresponds to the lower sealing surface 332. The upper and lower sealing surfaces 321 and 332 are thermally fused to each other after the battery unit 31 is inserted into the space 331.

Figure 6:
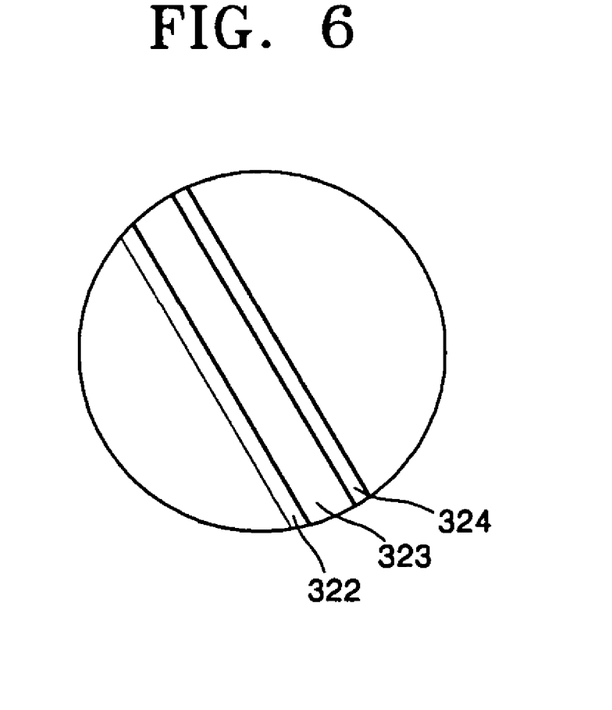
FIG. 6 illustrates an enlarged perspective view of a case of FIG. 4.

FIG. 6 illustrates an enlarged perspective view of a case of FIG. 4. According to an embodiment of the invention, the upper and lower portions 320, 330 are made of the substantially same material. Each of the upper and lower portions 320, 330 of the case 310 comprises an inner layer 322 made of an insulating polymer film, an intermediate layer 323 made of a metal material, and an outer layer 324 made of an insulating polymer film, which are sequentially laminated to form a stacked structure, as illustrated in FIG. 6.

The battery unit 31 is formed by repeatedly folding the positive plate 32, the separator 34, and the negative plate 33, which are sequentially laminated, in one direction. The wound battery unit 31 is inserted into the space 331 of the lower portion 330. In this case, an end portion of each of the positive and negative tabs 35 and 36, which are drawn from the respective electrode plates 32 and 33, is exposed outside the case 310.

Then, when predetermined amounts of heat and pressure are applied to the case 310 while the upper and lower sealing surfaces 321 and 332 come in contact with each other, the upper and lower sealing surfaces 321, 332 are thermally fused to each other. Accordingly, the pouch-type lithium secondary battery 30 is completed.

The insulating tapes 37 and 38, which wrap the electrode tabs 35 and 36, respectively, are interposed between and thermally fused to the upper and lower sealing surfaces 321 and 332. End portions of the insulating tapes 37 and 38 are exposed outside the case 310 and folded together with the electrode tabs 35 and 36 at least one time.

The folding of the electrode tabs 35 and 36 and the insulating tapes 37 and 38 will now be described in more detail.

Figure 7:
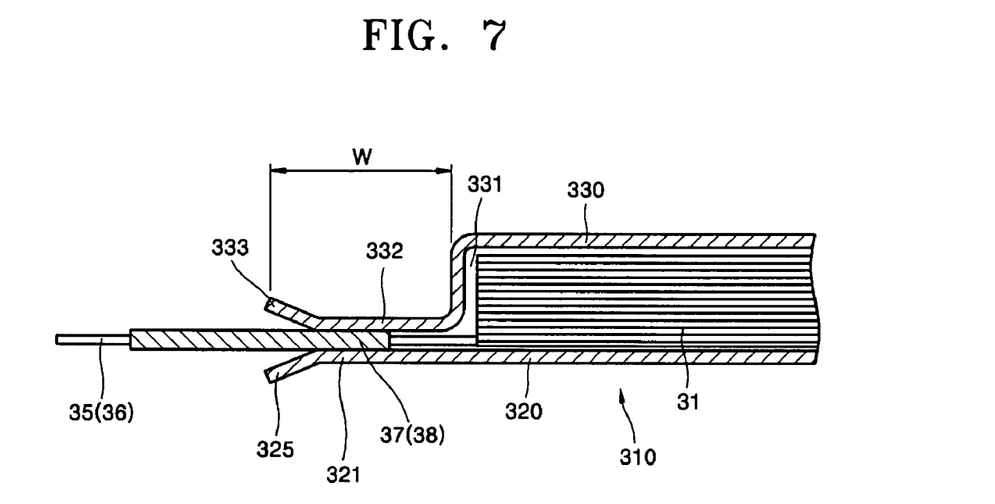
FIG. 7 illustrates a sectional view of an unfolded state of an electrode tab in the lithium secondary battery of FIG. 4.
Figure 8:
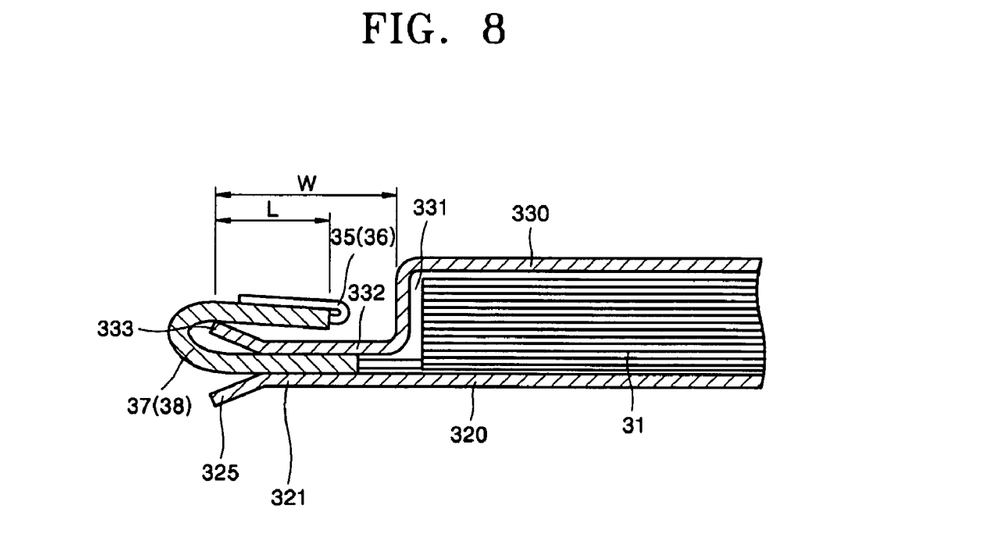
FIG. 8 illustrates a sectional view of a folded state of the electrode tab in the lithium secondary battery of FIG. 4.

FIG. 7 illustrates an unfolded state of the electrode tabs 35 and 36 of FIG. 4 and FIG. 8 illustrates a folded state of the electrode tabs 35 and 36 of FIG. 4.

In FIGS. 7 and 8, the same reference numerals as in FIG. 4 indicate the same constitutional elements, which execute the same functions.

Referring to FIG. 7, the upper portion 320 is formed with the upper sealing surface 321. The lower portion 330 is also formed with the lower sealing surface 332, which faces the upper sealing surface 321. Each of the upper and lower sealing surfaces 321 and 332, which are thermally fused to each other, has a predetermined width W.

The end portion 325 of the upper sealing surface 321 is inclined at a predetermined angle in one direction. The end portion 333 of the lower sealing surface 332 is inclined at a predetermined angle in a direction opposite to the end portion 325 of the upper sealing surface 321 with respect to the electrode tabs 35 and 36. Therefore, the end portions 325, 333 of the upper and lower sealing surfaces 321 and 332 are inclined at a predetermined angle upwardly and downwardly with respect to the electrode tabs 35 and 36, respectively.

The electrode tabs 35 and 36, which are wrapped with the insulating tapes 37 and 38, are positioned between the upper and lower sealing surfaces 321 and 332. Here, end portions of the insulating tapes 37 and 38 are exposed outside the case 310. The exposed insulating tapes 37 and 38 have portions which come in contact with the end portion 325 of the upper sealing surface 321 or the end portion 333 of the lower sealing surface 332, when folded together with the electrode tabs 35 and 36 toward the case 310.

According to an embodiment of the invention, the folded length L of the insulating tapes 37 and 38 is at least 5% of the total width W of the sealing surfaces 321 and 332, to prevent a short circuit between the case and the electrode tabs. Although there is no need to set a specific upper limit of the folded length, about 90% of the total width W of the sealing surfaces 321 and 332 is sufficient in view of the efficiency of a battery manufacturing process. Therefore, the folded length of the insulating tapes 37 and 38 ranges from 5 to 90% of the total width W of the sealing surfaces 321 and 332. According to the results of experiments performed by the present applicant, the optimal folded length ranges from 30 to 50%.

End portions of the exposed insulating tapes 37 and 38 are folded together with the electrode tabs 35 and 36, starting from the end portion 325 of the upper sealing surface 321 or the end portion 333 of the lower sealing surface 332, toward the case 310. Then, after being folded again in the opposite direction, the end portions of the electrode tabs 35 and 36 are electrically connected to a separately prepared protective circuit board.

Figure 9:
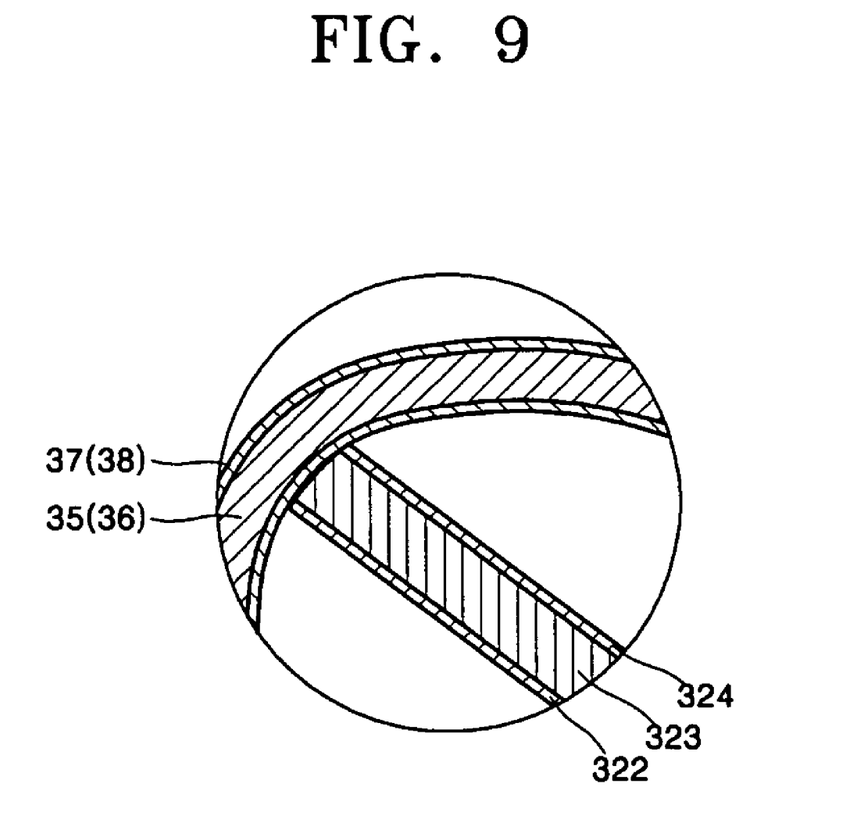
FIG. 9 illustrates an enlarged sectional view of the folded portion of the electrode tab of FIG. 8.

FIG. 9 illustrates an enlarged sectional view of the folded portion of the electrode tab. Here, because the end portions of the insulating tapes 37 and 38 are positioned outside the sealing surfaces 321 and 332, the electrode tabs 35 and 36 do not come in direct contact with the intermediate layer 323 of the case 310.

Figure 10:
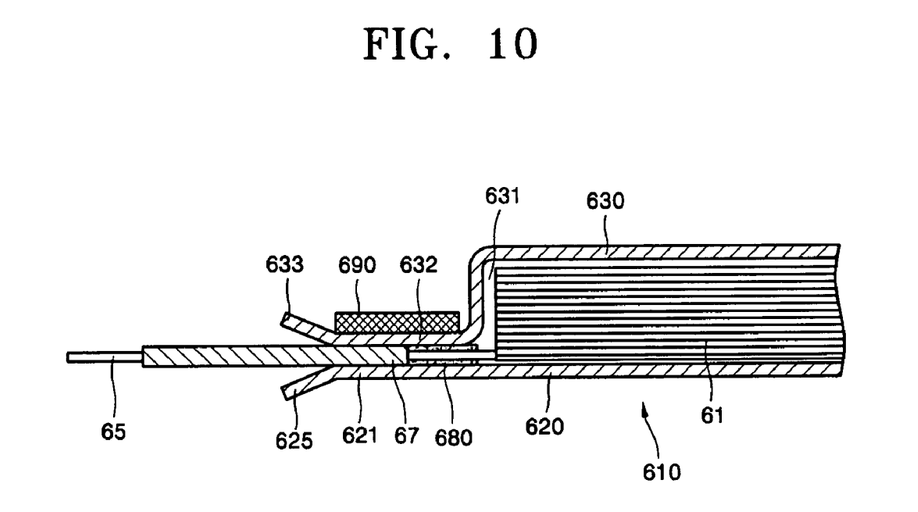
FIG. 10 is a sectional view of an unfolded state of an electrode tab according to another embodiment of the present invention.
Figure 11:
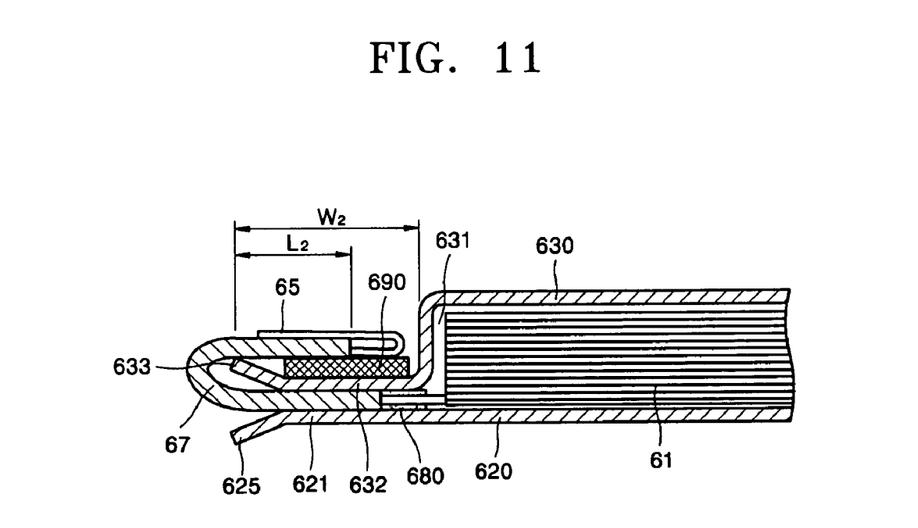
FIG. 11 is a sectional view of a folded state of the electrode tab of FIG. 10

FIG. 10 is a sectional view of an unfolded state of an electrode tab 65 according to another embodiment of the present invention and FIG. 11 is a sectional view of a folded state of the electrode tab 65 of FIG. 10. Referring to FIGS. 10 and 11, an upper portion 620 is formed with an upper sealing surface 621. A lower portion 630 is also formed with a lower sealing surface 632, which faces the upper sealing surface 621. An end portion 625 of the upper sealing surface 621 and an end portion 633 of the lower sealing surface 632 are inclined at a predetermined angle in opposite directions.

The electrode tab 65, which is wrapped with an insulating tape 67, is positioned between the upper and lower sealing surfaces 621 and 632. Here, an end portion of the insulating tape 67 is exposed outside a case 610. The case 610 has a space 631 for receiving a battery unit 61. The exposed insulating tape 67 has a portion which contacts with the end portion 625 of the upper sealing surface 621 or the end portion 633 of the lower sealing surface 632, when folded together with the electrode tab 65 toward the case 610.

The folded length L2 of the insulating tape 67 may be at least 5% of the total width W2 of the upper and lower sealing surfaces 621 and 632, to prevent a short circuit between the case 610 and the electrode tab 65. According to an embodiment of the invention, the folded length L2 of the insulating tape 67 ranges from 5 to 90%. In another embodiment of the invention, the folded length L2 of the insulating tape 67 ranges from 30 to 50% of the total width W2 of the upper and lower sealing surfaces 621 and 632.

A short-circuit prevention tape 690 may be attached to one of the upper and lower sealing surfaces 621 and 632. The short-circuit prevention tape 690 may be attached onto the lower sealing surface 632 on which the folded portion of the electrode tab 65 wrapped by the insulating tape 67 is positioned. The short-circuit prevention tape 690 may be attached in the widthwise direction of the lower sealing surface 632 along the outer surface of the lower sealing surface 632.

Figure 12:
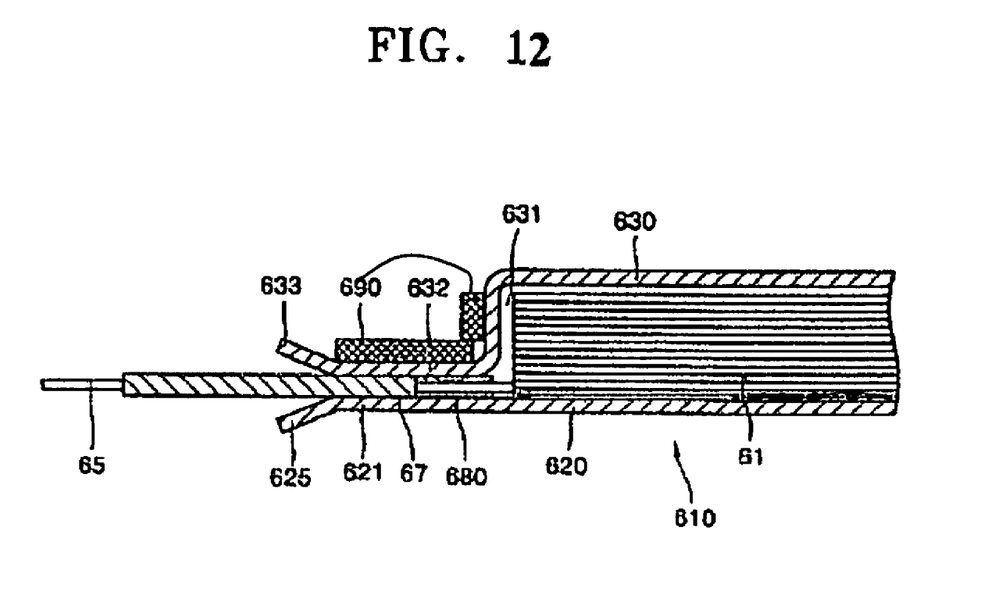
FIG. 12 illustrates a sectional view of an unfolded state of an electrode tab according to another embodiment of the invention.

In another embodiment of the invention, as shown in FIG. 12, the short circuit prevention tape 690 may be additionally or alternately attached to a wall of the lower portion 630 of the case 610 that extends in a thickness direction of the case 610. According to this embodiment of the invention, it is understood that the insulating tape is any polymer material. It is further understood that the polymer material used as the insulating tape may be used as the insulating tape 67 in all the embodiments of the invention.

At this time, an exposed portion of the electrode tab 65 is disposed on the short-circuit prevention tape 690. The folded portion of the insulating tape 67 overlaps with the short-circuit prevention tape 690.

When the insulating tape 67 is folded, starting from an end portion of the lower sealing surface 632, toward the case 610, the folded length L2 of the insulating tape 67 may be at least 5% of the total width W2 of the lower sealing surface 632. According to an embodiment of the invention, the folded length L2 of the insulating tape 67 may be 5-90% of the total width W2 of the lower sealing surface 632, or, according to another embodiment of the invention, 30-50% of the total width W2 of the lower sealing surface 632.

Meanwhile, a polymer 680 may be coated on at least a portion of the electrode tab 65 corresponding to the upper and lower sealing surfaces 621 and 632 to prevent an electrical short-circuit between the electrode tab 65 and the upper and lower sealing surfaces 621 and 632.

It is understood that the polymer 680, in an embodiment of the invention, may serve to seal a conversion of the upper and lower sealing surfaces 621 and 632. Alternately, the polymer may serve to only seal the conversion of the upper and lower sealing surfaces 621 and 632 around the second parts of the electrode tabs or, separately, to insulate the case 610.

An exposed end portion of the insulating tape 67 is folded together with the electrode tab 65 toward the lower sealing surface 632. Then, after being again folded in the opposite direction, the end portion of the electrode tab 65 is electrically connected to a separately prepared protective circuit board. At this time, because the end portion of the electrode tab 65 is positioned on the short-circuit prevention tape 69, the electrode tab 65 is not directly contacted to the lower sealing surface 632.

As apparent from the above description, a pouch-type lithium secondary battery of the present invention provides the following effects. First, a portion of the insulating tape exposed outside the sealing surface of the case is extended and the extended portion of the insulating tape comes in contact with the end portion of the sealing surface after being folded. Therefore, an electrical short circuit between the electrode tab and the intermediate layer of the metal case is prevented.

Second, the insulating tape, which is exposed outside the case, is folded toward the case and then positioned outside the sealing surface. Therefore, the likelihood of direct contact between a protective circuit board and the surface of the case is lowered.

Third, because a portion of the insulating tape exposed outside the case is relatively long, a short circuit caused by stripping of an outer layer of the case may be prevented. Therefore, the safety and reliability of the lithium secondary battery may be enhanced.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A pouch-type lithium secondary battery including a battery unit having a positive electrode, a separator, and a negative electrode being wound together, the pouch-type lithium secondary battery comprising;
    a pair of electrode tabs drawn from the positive and negative electrodes, respectively;
    a case, having a space to receive the battery unit, including upper and lower sealing surfaces of respective upper and lower portions which are thermally fused to each other and which allow first parts of the electrode tabs to extend to an exterior of the case;
    a short-circuit prevention tape formed on an exterior of the case, the first parts of the electrode tabs being folded and having sufficient lengths so as to contact with the short-circuit prevention tape; and
    a polymer material coated on at least a portion of second parts of each electrode tab which are inside of the case to seal the fusion of the upper and lower sealing surfaces around the second parts of the electrode tabs.

2. The pouch-type lithium secondary battery of claim 1, further comprising an insulating tape for wrapping the electrode tabs, wherein a portion of the insulating tape interposed between the upper and lower sealing surfaces is thermally fused to the upper and lower sealing surfaces, and an end portion of the insulating tape is exposed outside the case together with the first parts of the electrode tabs.

3. The pouch-type lithium secondary battery of claim 1, wherein the short-circuit prevention tape is attached in the widthwise direction of the upper and lower sealing surfaces.

4. The pouch-type lithium secondary battery of claim 1, wherein the first parts of the electrode tabs comprise exposed potions thereof, each exposed portion of the electrode tabs being disposed on the short-circuit prevention tape.

5. The pouch-type lithium secondary battery of claim 4, wherein the electrode tabs wrapped with the insulating tape are folded from an end portion of the upper or lower sealing surface toward the case.

6. The pouch-type lithium secondary battery of claim 5, wherein the insulating tape is folded together with the electrode tabs and comprises a portion contacting with an end portion of one of the upper and lower sealing surfaces when folded.

7. The pouch-type lithium secondary battery of claim 6, wherein the portion of the insulating tape contacting with the one of the upper and lower sealing surfaces completely wraps the electrode tabs to electrically insulate the electrode tabs and the case.

8. The pouch-type lithium secondary battery of claim 6, wherein the folded portion of the insulating tape overlaps with the short-circuit prevention tape.

9. The pouch-type lithium secondary battery of claim 6, wherein the folded portion of the insulating tape is at least 5% of the total width of the upper or lower sealing surface.

10. The pouch-type lithium secondary battery of claim 6, wherein the folded portion of the insulating tape ranges from 5 to 90% of the total width of the upper or lower sealing surface.

11. The pouch-type lithium secondary battery of claim 6, wherein the folded portion of the insulating tape ranges from 30 to 50% of the total width of the upper or lower sealing surface.

12. The pouch-type lithium secondary battery of claim 1, wherein the short-circuit prevention tape is located on one of the upper and lower sealing surfaces at the conversion of the upper and lower sealing surfaces.

13. The pouch-type lithium secondary battery of claim 1, wherein the lower portion of the case comprises a wall extending in a thickness direction of the battery unit, wherein the short-circuit prevention tape is located on the wall.

14. The pouch-type secondary battery of claim 1, wherein the first parts of the electrode tabs are folded into U-shapes.

15. The pouch-type secondary battery of claim 1, wherein the first parts of the electrode tabs are folded into S-shapes.

16. The pouch-type lithium secondary battery of claim 1, wherein the short circuit prevention material formed on the exterior of the case is selected from the group consisting of tape and a polymer layer.

17. A pouch-type lithium secondary battery including a battery unit having a positive electrode, a separator, and a negative electrode being wound together with electrode tabs being drawn from the respective electrodes, the pouch-type lithium secondary battery comprising;
    a case, having a space to receive the battery unit, including upper and lower sealing surfaces of respective upper and lower portions which are thermally fused to each other and which allow first parts of the electrode tabs to extend to an exterior of the case;
    a short-circuit prevention tape attached to an exterior of the case, the first parts of the electrode tabs being folded and having sufficient lengths so as to contact with the short-circuit prevention tape;
    a first polymer material to wrap a portion of the first parts of the electrode tabs; and
    a second polymer material coated on at least a portion of second parts of each electrode tab which are inside of the case to seal the fusion of the upper and lower sealing surfaces around the second parts of the electrode tabs and to insulate the case.

18. The pouch-type lithium secondary battery of claim 17, wherein the short-circuit prevention tape is located on one of the upper and lower sealing surfaces at the conversion of the upper and lower sealing surfaces.

19. The pouch-type lithium secondary battery of claim 17, wherein the lower sealing surface of the case comprises a wall extending in a thickness direction of the battery unit, wherein the short-circuit prevention tape is located on the wall.

20. The pouch-type lithium secondary battery of claim 17, wherein the first parts of the electrode tabs are folded into U-shapes.

21. The pouch-type lithium secondary battery of claim 17, wherein the first parts of the electrode tabs are folded into S-shapes.

22. The pouch-type lithium secondary battery of claim 17, wherein the portion of the first parts of the electrode tabs is shorter than the entire length of the first parts of the electrode tabs.

* * * * *

UNITED STATES PATENT AND TRADEMARK OFFICE
CERTIFICATE OF CORRECTION

PATENT NO. : 7,585,589 B2  
APPLICATION NO. : 11/186835  
DATED : September 8, 2009  
INVENTOR(S) : Joong-Hun Kim

Page 1 of 1

It is certified that error appears in the above-identified patent and that said Letters Patent is hereby corrected as shown below:

Title Page, Page 2, col 2, Foreign Patent Documents,
    change "JP   2001-25960   9/2001" to --JP   2001-256960   9/2001--.

Signed and Sealed this

Twenty-second Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,585,589 B2
APPLICATION NO. : 11/186835
DATED : September 8, 2009
INVENTOR(S) : Joong-Hun Kim It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1082 days.

Signed and Sealed this

Fourteenth Day of September, 2010

David J. Kappos
*Director of the United States Patent and Trademark Office*